United States Patent
Liden et al.

(10) Patent No.: US 9,921,959 B2
(45) Date of Patent: Mar. 20, 2018

(54) EFFICIENT REFERENCE CLASSIFICATION AND QUICK MEMORY REUSE IN A SYSTEM THAT SUPPORTS CONCURRENT GARBAGE COLLECTION

(71) Applicant: Oracle International Corporation, Redwood Shores, CA (US)

(72) Inventors: Per A. Liden, Stockholm (SE); Stefan Mats Rikard Karlsson, Nacka (SE)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/267,748

(22) Filed: Sep. 16, 2016

(65) Prior Publication Data
US 2017/0262364 A1 Sep. 14, 2017

Related U.S. Application Data

(60) Provisional application No. 62/307,062, filed on Mar. 11, 2016.

(51) Int. Cl.
G06F 12/00 (2006.01)
G06F 12/02 (2006.01)
G06F 12/1009 (2016.01)

(52) U.S. Cl.
CPC ...... G06F 12/0269 (2013.01); G06F 12/1009 (2013.01); G06F 2212/1044 (2013.01); G06F 2212/152 (2013.01); G06F 2212/657 (2013.01)

(58) Field of Classification Search
None
See application file for complete search history.

(56) References Cited

U.S. PATENT DOCUMENTS 5,873,104 A 2/1999 Tremblay et al.
2005/0235006 A1* 10/2005 Adl-Tabatabai ........ G06F 8/443

OTHER PUBLICATIONS

Click et al.; "The Pauseless GC Algorithm", VEE 05, Jun. 11-12, 2005, Chicago, Illinois, USA. Copyright 2005 ACM 1-59593-047-7/05/0006 . . . $5.00.
Tene et al.; "C4: The Continuously Concurrent Compacting Collector" ISMM'11, Jun. 4-5, 2011, San Jose, CA, USA copyright 2011, ACM 978-1-4503-0263-0/11/06 . . . $10.00.

* cited by examiner

*Primary Examiner* — Duc Doan
(74) *Attorney, Agent, or Firm* — Park, Vaughan, Fleming & Dowler LLP

(57) ABSTRACT

The disclosed embodiments facilitate reusing both the physical and virtual memory in a garbage-collected computing environment immediately after a relocated memory area has been emptied, without using special hardware or operating system extensions. This system uses load barrier to perform fast checks to determine if a reference might point into a relocated memory area. If so, the load barrier performs further actions to remap pointers that actually point into the relocated memory area, without the need to read that memory. Because the system neither follows pointers into relocated memory areas nor protects relocated memory areas, the system can immediately reuse the virtual memory areas. The load barrier ensures that references pointing into a relocated memory area will be caught and handled, and references pointing into the newly allocated memory will pass through the barrier without further actions.

20 Claims, 12 Drawing Sheets

EFFICIENT REFERENCE CLASSIFICATION AND QUICK MEMORY REUSE IN A SYSTEM THAT SUPPORTS CONCURRENT GARBAGE COLLECTION

CROSS-REFERENCE TO RELATED APPLICATION

This application claims priority under 35 U.S.C. § 119(e) to U.S. Provisional Application Ser. No. 62/307,062, entitled "Efficient Load Barrier for Concurrent Garbage Collection," by inventors Per Liden and Stefan Karlsson, filed on 11 Mar. 2016, the contents of which are incorporated by reference herein.

BACKGROUND

Field

The disclosed embodiments relate to computing systems that support garbage-collection operations to automatically reclaim memory locations that are no longer in use. More particularly, the disclosed embodiments related to a technique that supports efficiently classifying object references and quickly reusing memory in a computing environment that supports concurrent garbage collection.

Related Art

Many computing environments provide garbage-collection system to automatically reclaim memory locations, which are occupied by objects that are no longer being used by an application. Garbage-collection systems free the programmer from having to explicitly specify which objects to deallocate and return the memory system. However, applications often have to pause while waiting for garbage-collection operations to complete. One way to reduce these pause times is to use a garbage collector that supports concurrent marking and concurrent relocation. By performing most of the work in the concurrent phases, only a small portion of the garbage-collection work has to be done during time periods that can cause applications to pause.

Another aspect of concurrent garbage collectors is that, unlike non-concurrent garbage collectors, application threads can continue to allocate new objects while the garbage collector is running. This means that heap usage can potentially keep growing while the garbage collector is running, which in turn means that the garbage collector's ability to quickly reclaim and reuse memory becomes important to keep the overall heap size down.

In spite of the performance advantages of concurrent garbage-collectors, existing concurrent garbage-collection implementations continue to adversely affect application performance by: (1) interfering with and/or slowing execution of the application; and (2) preventing the reuse of reclaimed memory until all of the pointers in the reclaimed memory have been updated.

SUMMARY

The disclosed embodiments provide a garbage-collected computing environment that facilitates reusing both the physical and virtual memory immediately after a relocated memory area has been emptied, without the need for special hardware or operating system extensions. This system uses a load barrier to perform fast checks to determine if a reference might point into a relocated memory area. If so, the load barrier performs further actions to remap pointers that actually point into the relocated memory area, without the need to read that memory. Because the system neither follows pointers into relocated memory areas nor protects relocated memory areas, the system does not need to preserve the virtual memory mappings for these memory areas. Moreover, the system can immediately reuse both physical memory and virtual memory to allocate new objects. The load barrier ensures that references pointing into a relocated memory area will be caught and handled, and references pointing into the newly allocated memory will pass through the barrier without further action.

In this computing environment, each pointer used by the applications includes metadata in addition to address bits. This metadata includes a first mark bit, a second mark bit and a remap bit. During each collection cycle for the garbage collector, one of the first mark bit and the second mark bit is designated as a current mark bit, and the remaining mark bit is designated as an old mark bit. Moreover, the current mark bit alternates between the first mark bit and the second mark bit during successive collection cycles.

During a marking phase of a collection cycle, the system modifies each pointer that is accessed so that the pointer's current mark bit is set and the pointer's old mark bit and remap bit are not set.

While the system executes an application outside of a marking phase, in response to the application executing an instruction that loads a pointer from memory, the system performs the following operations. If one of the first mark bit and the second mark bit is set, the system takes further actions. These further actions involve determining whether the object has been relocated to a new address during a current collection cycle for the garbage collector. If so, the system updates the pointer to point to the new address, and modifies the pointer so that the remap bit is set and the first and second mark bits are not set.

In some embodiments, the pointer is loaded from memory into a local variable or a register.

In some embodiments, in response to the application subsequently executing an instruction that accesses an object through the pointer after the pointer has been loaded from memory, the system dereferences the pointer to access the object.

In some embodiments, the system applies a load barrier to pointers loaded by the executing applications and the garbage collector, wherein the load barrier is responsible for performing any operations that read and/or modify the first mark bit, the second mark bit and the remap bit.

In some embodiments, the load barrier ensures that only one of the first mark bit, the second mark bit and the remap bit is set at any given time. Moreover, the load barrier designates one of the first mark bit, the second mark bit and the remap bit as a good bit, wherein during a marking phase, the current mark bit is designated as the good bit, and wherein at the start of a relocation phase for the garbage collector, the remap bit is designated as the good bit. During operation, the load barrier uses a bad bitmask, which masks out the good bit and does not mask out other metadata bits, thereby enabling the load barrier to execute a single test-and-branch instruction sequence to determine whether to take further actions based on whether any metadata bit besides the good bit is set while simultaneously filtering out NULL pointers and other pointers that have no metadata bits set.

In some embodiments, a weak load barrier is additionally applied to some loaded pointers, wherein while determining whether to take further actions, the weak load barrier uses a modified bad bitmask, which masks out all of the metadata bits except for the remap bit.

In some embodiments, after an object is relocated by the garbage collector and a forwarding table is updated to indicate a new location for the object, the system can immediately reuse memory locations that were occupied by the object prior to the relocation without having to wait until pointers that reference object are updated to point to the new location for the object. Moreover, when an application attempts to load a pointer to an object that has been relocated, the system uses a load barrier to ensure that the object is accessed through an updated pointer that points to a new location for the object.

In some embodiments, both physical memory and virtual memory locations that were occupied by the object prior to the relocation can be reused.

In some embodiments, while executing an application inside of a marking phase for the garbage collector, in response to the application executing an instruction that loads a pointer from memory, the system performs the following operations. If one of the remap bit and the old mark bit is set, the system takes further actions, which involves performing the following operations. If the remap bit is not set, the system determines whether the object has been relocated to a new address during the previous collection cycle for the garbage collector. Upon determining that the object has been relocated, the system updates the pointer to point to the new address, marks the object as live, and modifies the pointer so that the current mark bit is set and the remap bit and the old mark bit are not set.

BRIEF DESCRIPTION OF THE FIGURES

In the figures, like reference numerals refer to the same figure elements.

DETAILED DESCRIPTION

Figure 1:
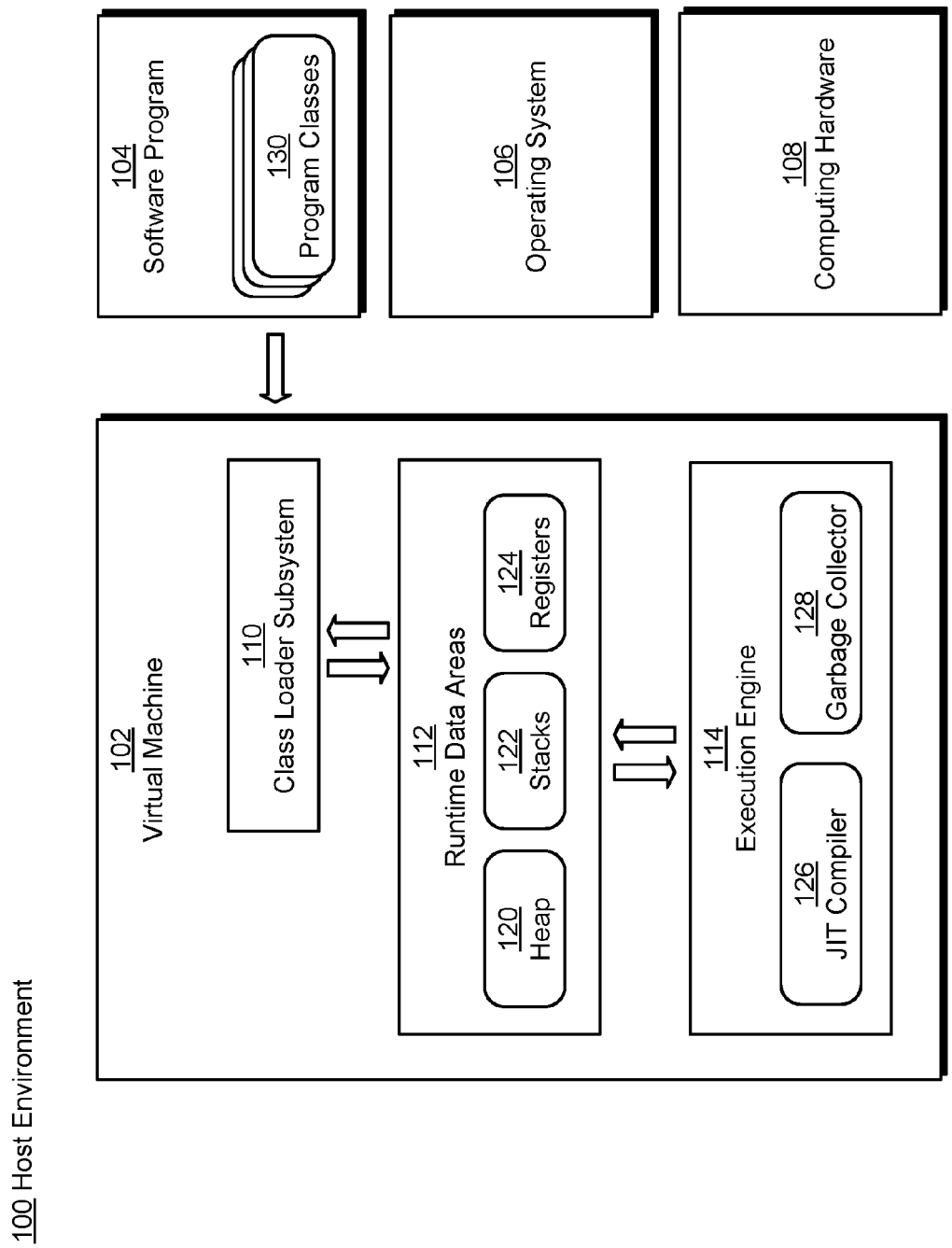
FIG. 1 illustrates a host computing environment in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, flash storage, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide a system, apparatus, and methods for efficiently classifying and marking and/or remapping pointers loaded by a software program that is subject to concurrent garbage collection. More specifically, the disclosed embodiments provide a system, apparatus, and methods for efficiently determining whether a pointer that is loaded by the software program during or after a garbage-collection cycle needs to be marked and/or remapped prior to using and/or dereferencing the pointer.

In general, a software program may rely on a garbage collector provided by the execution environment to reclaim dead objects from heap memory, wherein the dead objects that were previously allocated by the software program. To avoid jeopardizing the integrity of the software program's state (i.e., object graph), certain garbage collector implementations may pause all mutator threads of the software program while reclaiming memory from the heap. Known as a "stop-the-world event," this pause in execution may degrade the software program's performance if it runs too long, especially if latency is a concern. The necessity of pausing all mutator threads of a software program during garbage collection is especially problematic when dealing with large heaps (e.g., 50 gigabytes (GB) or more) because the time to process the entire heap grows along with the heap's size.

The impact of stop-the-world events may be mitigated through the use of an incremental garbage collector that is capable of performing a garbage collection on a portion of the heap (i.e., perform an incremental garbage collection). Here, the portion of the heap that is selected for garbage collection (e.g., the relocation set) may correspond to one or more regions of the heap.

Additionally, a concurrent garbage collector may be used, which performs garbage collections on the object graph concurrently with the software program's mutator threads performing operations on the object graph. Because mutator threads and garbage collector threads may alter the object graph without the other's knowledge, various measures may be used to provide coordination between the two groups of threads.

One measure involves applying a load barrier to pointers loaded by either the garbage collector or the software program. However, because numerous pointers may be loaded over the course of the software program's execution, it is important for the load barrier to incur minimal overhead. Thus, the disclosed embodiments provide an efficient and versatile load barrier that may be used for (1) marking objects during the marking phases of garbage-collection cycles, and (2) remapping pointers during and after relocation phases of garbage-collection cycles, while filtering out NULL pointers and pointers to parts of the heap that should be ignored by the garbage collector. Execution environments that make use of this load barrier (1) may have reduced runtime overhead, and (2) may provide quick reuse of heap memory freed during garbage collection and address ranges associated with the heap memory without relying on expensive system calls or specific kernel modules.

During operation, a software program executes within a host computing environment that provides (1) heap memory for storing objects, and (2) concurrent garbage collection. As the software program executes, the software program creates objects on the heap and uses object references (i.e., pointers) to refer to the objects created on the heap and to link objects to each other, thereby giving rise to a connected object graph on the heap. Each pointer possesses a first set of bits for storing metadata (i.e., metadata bits) and a second set of bits for encoding the location of the object to which the pointer refers (i.e., the target object). In particular, the metadata bits may include a remap bit, a first mark bit, and a second mark bit, wherein for each pointer, no more than one of the three metadata bits may be set at any one time. Also, during each collection cycle for the garbage collector, one of the first mark bit and the second mark bit is designated as a "current mark bit," and the remaining mark bit is designated as an "old mark bit," wherein the current mark bit alternates between the first mark bit and the second mark bit during successive collection cycles. (For the purposes of this application, the phrase "metadata bits" refers to the combination of the first mark bit, the second mark bit, and the remap bit, while the phrase "metadata bit" refers to one of the first mark bit, the second mark bit, and the remap bit. However, note that in practice, a pointer may include other types of metadata bits.)

Whenever it is determined that heap memory needs to be reclaimed, the garbage collector performs a garbage-collection cycle. Each garbage-collection cycle includes a marking phase and a relocation phase.

During the marking phase, the garbage collector determines which objects are live by marking all objects that are reachable from the root set. For each pointer that is loaded by the garbage collector during the marking phase, a load barrier first determines whether the pointer has already been marked by determining whether a metadata bit other than the current mark bit is set. If the pointer has already been marked, the garbage collector moves on to check other objects. If the pointer has not yet been marked, the load barrier marks the pointer by modifying the pointer so that only the current mark bit of the metadata bits is set. The garbage collector then determines whether the target object is marked. If the target object is marked, the garbage collector moves on. If the target object is not marked, the garbage collector marks the target object and begins checking other objects that are referred to by pointers in the target object. In some embodiments, the target object may be marked before the pointer to the target object is marked.

While executing an application inside of the marking phase, when the software executes an instruction that loads a pointer, the application uses the load barrier to perform the following operations. If either the remap bit or the old mark bit is set, the system enters a slow path, which involves performing the following further actions. If the remap bit is not set, the system determines whether the object has been relocated to a new address during the previous collection cycle for the garbage collector. If so, the system updates the pointer to point to the new address, marks the object as live, and modifies the pointer so that the current mark bit is set and the remap bit and the old mark bit are not set.

Next, during the relocation phase, the garbage collector relocates all live objects from one or more regions of the heap (i.e., the relocation set) to one or more survivor regions of the heap and collects the dead objects. For each relocated object, the garbage collector (or a mutator thread) records a mapping between each relocated object's old address and new address in a forwarding table.

At the beginning of the relocation phase and until the start of the marking phase of the next garbage-collection cycle, whenever the software program attempts to load a pointer, the load barrier determines whether the pointer is safe to dereference by checking whether a metadata bit other than the remap bit is set. If not, the load barrier allows the software program to dereference or propagate the pointer. Otherwise, the load barrier consults the forwarding table to determine whether the target object is going to be or has been relocated in the latest garbage-collection cycle. (In some embodiments, prior to consulting forwarding table, as a pre-filtering step, the mutator thread executing the software program may determine whether the region where the pointer is located is part of the relocation set.) If the object is going to be (but has not yet been) relocated in the latest garbage-collection cycle, the load barrier (1) relocates the object, (2) updates the forwarding table point to the new address and to indicate that the object has been relocated, (3) updates the pointer to point to the object's new location, and (4) modifies the pointer so that the remap bit is the only metadata bit that is set. On the other hand, if target object has already been relocated in the latest garbage-collection cycle, the load barrier (1) updates the pointer to point to the object's new location, and (2) modifies the pointer so that the remap bit is the only metadata bit that is set. Finally, if the target object was not and is not going to be relocated in the latest garbage-collection cycle, the load barrier modifies the pointer so that the remap bit is the only metadata bit that is set without updating the pointer's address. Then, the load barrier allows the software program to dereference or propagate the pointer. The next attempt to load the same pointer will be quickly allowed by the load barrier because the pointer's remap bit is now set. Until the start of the next garbage-collection cycle, additional pointers are remapped by the load barrier as the software application continues to load pointers during its execution.

Because not all pointers may have been remapped by the start of the marking phase of the next garbage-collection cycle, the garbage collector marks pointers by checking whether a metadata bit other than the current mark bit for the next garbage-collection cycle is set. (Recall, that the current mark bit alternates between the first mark bit and the second mark bit between successive garbage-collection cycles.) However, the load barrier uses the same remap bit regardless of which garbage-collection cycle is presently taking place.

It should be noted that some embodiments provide a system that combines multiple checks into one versatile and efficient load barrier. In particular, the load barrier is used for remapping pointers, marking pointers, and filtering out NULL pointers and other pointers that have no metadata bits set for a software program during its execution.

FIG. 1 shows a diagram of a system in accordance with the disclosed embodiments. As shown in FIG. 1, software program 104 may execute on virtual machine 102. Virtual machine 102 may execute on top of operating system 106 and/or computing hardware 108, all of which are contained within host environment 100 of the host system. More specifically, during software program 104's execution, program classes 130 of software program 104 may be loaded by class loader subsystem 110 into runtime data areas 112. Additionally, one or more components of execution engine 114 may operate on data present in runtime data areas 112. These components may include Just-in-Time (JIT) compiler 126 and garbage collector 128.

Host environment 100 may correspond to a stack of one or more software components that execute on computing hardware 108, which may correspond to a smartphone, a cell phone, a personal digital assistant (PDA), a laptop computer, a desktop computer, a tablet computer, a server, a cluster of servers, a hypervisor, a container, or an embedded system.

Software program 104 may be an application that executes on an operating system, an embedded application that executes on firmware, an enterprise application, a database, a shared library, a device driver, and/or any other type of software program. Software program 104 may be written in a high-level programming language that can be compiled into an intermediate code via a compiler. Additionally, software program 104, in its intermediate code form, may be configured to execute on virtual machine 102. For example, software program 104 may be written in the Java programming language; virtual machine 102 may follow the Java Virtual Machine (JVM) specification; and software program 104 may be compiled into Java byte code, which may be executed on any software environment that includes a JVM. Additionally, software program 104 may be composed of one or more classes that specifically implement functionality of the software program, which are represented by program classes 130. For example, program classes 130 may each correspond to a class written in a high-level programming language (e.g., Java) that has been compiled to an intermediate code (e.g., Java byte code).

Virtual machine 102 may correspond to any virtual machine that provides one or more data areas for storing software program 104 in its intermediate code form at runtime and an interpreter and/or a just-in-time (JIT) compiler for executing the loaded intermediate code. A virtual machine may be referred to as a software implementation of a machine that executes programs like a physical machine. Examples of JVM implementations include Oracle Hotspot JVM and International Business Machines (IBM) JVM. In particular, virtual machine 102 may include class loader subsystem 110, runtime data areas 112, and execution engine 114.

Class loader subsystem 110 may correspond to a component of virtual machine 102 that handles the loading of program classes 130, which have been compiled into intermediate code, into one or more data areas of the virtual machine at runtime.

Runtime data areas 112 may correspond to one or more referenced memory areas organized by virtual machine 102 to hold the intermediate code of software program 104 and the data it operates upon during execution. In particular, the runtime data areas provided by virtual machine 102 to execute software program 104 may include heap 120, stacks 122, and registers 124. In cases where software program 104 is multi-threaded, some components of runtime data areas 112 are shared among all threads while others are unique to individual threads. One stack exists for each thread. The stack is created when the thread starts. Thus, stacks 122 may refer to all stacks created and assigned to the threads of software program 104. A thread's stack may store the state of one or more current method invocations for the thread in one or more stack frames. A stack frame is created and pushed onto a thread's stack when a method is executed in virtual machine 102 by the thread. When the method finishes, the stack frame is popped off the stack. In particular, a stack frame contains one or more components of the method's state, which may include one or more local variables, one or more parameters with which the method was invoked, one or more return values, and intermediate calculations. Some local variables and/or parameters may hold primitive data values, which are stored in the stack frame. Other local variables and/or parameters may hold references to objects, which are created and stored on heap 120. Thus, object references stored in (1) all stack frames of all stacks for a software program, and (2) other non-heap memory for the software program may be referred to as the "root set" of the software program. In some embodiments, the root set may additionally include any object references, such as strings, in a constant pool of loaded classes. The constant pool of a loaded class may refer to strings stored on the heap, such as class names, superclass names, superinterface names, field names, field signatures, method names, and method signatures.

Heap 120 may correspond to a heap, which is a referenced memory area that stores objects created during the execution of a software program. Unlike stacks, however, a heap may be shared by all threads. Whenever a thread creates an object, the object is stored in a portion of memory allocated on the heap while a reference to the object is created and stored in the current stack frame of the thread. This reference to the object may be passed from method to method within the thread and even shared among multiple threads within their stack frames. Threads may then use these references to access the object and modify the object on the heap. Additionally, other objects that are allocated on the heap may possess references to the object. So long as the object is reachable from the software program's root set (e.g., directly by a thread through a reference stored on its stack, or indirectly through one or more other objects on the heap), the object is known as a live object (i.e., an object with liveness). Objects that are unreachable from the software program are considered garbage and are the target of garbage collection.

Execution engine 114 may correspond to a component of virtual machine 102 that executes the intermediate code, which is loaded into runtime data areas 112 by class loader subsystem 110. In particular, the execution engine may employ JIT compiler 126 to periodically compile portions of the intermediate code into native code, which is then directly executed by execution engine 114. Additionally, execution engine 114 may provide garbage collector 128.

Garbage collector 128 may correspond to a concurrent garbage collector used by execution engine 114 to manage memory in heap 120 during the execution of software program 104. Functions performed by garbage collectors may include: (1) automatically clearing garbage (i.e., unreachable objects) from the heap, and (2) moving objects between sections of the heap to reduce heap fragmentation.

A software program may constantly create and store objects in heap memory. Garbage collectors may prevent the heap from running out of memory by automatically reclaiming objects that are unreachable from the software program's root set. Additionally, free space within the heap may become fragmented due to objects being allocated and reclaimed at various locations throughout the heap. To help ensure that the heap can provide large contiguous blocks of memory with which to store larger objects of the software program, the garbage collector may periodically compact all live objects into alternative sections of the heap, thereby combining small pockets of free heap space into larger ones. To accomplish these tasks more efficiently, the garbage collector may conceptually divide the heap into multiple regions, as discussed in further detail below with respect to FIG. 2.

Figure 2:
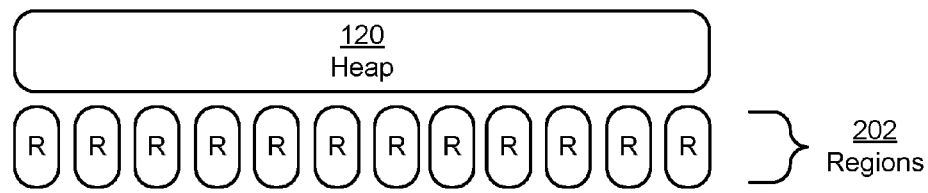
FIG. 2 shows a conceptual division of a heap into multiple parts in accordance with the disclosed embodiments.

FIG. 2 shows conceptual divisions of a heap into multiple parts in accordance with the disclosed embodiments. More specifically, FIG. 2 displays how a garbage collector may conceptually divide a heap into multiple regions so that dead objects can be collected more efficiently.

To more efficiently conduct garbage collection over heap 120, garbage collector 128 may divide heap 120 into a plurality of regions (regions 202). In some embodiments, these regions may be of equal sizes. In other embodiments, each region may have a size that is a multiple of the smallest allowed heap region size (e.g., 2 megabytes). To preserve the runtime state of software program 104 during each garbage collection, garbage collector 128 may move and/or copy out all live objects within a region to a different region (e.g., a survival region) prior to reallocating the original region. In embodiments where garbage collector 128 is capable of in-place compaction, the live objects within a region may be relocated and compacted into a different location of the same region rather than to a different region. Live objects may include objects that garbage collector 128 can reach by following one or more references from software program 104's root set. After moving and/or copying out these objects, garbage collector 128 then deallocates all other objects within the relocation set. Garbage collectors are further discussed in U.S. Pat. No. 5,873,104, entitled "Bounded-Pause Time Garbage Collection System and Method Including Write Barrier Associated with Source and Target Instances of a Partially Relocated Object," by Marc Tremblay, et al., filed on Jun. 26, 1997, and issued on Feb. 16, 1999, the contents of which are incorporated herein by reference.

Figure 3:
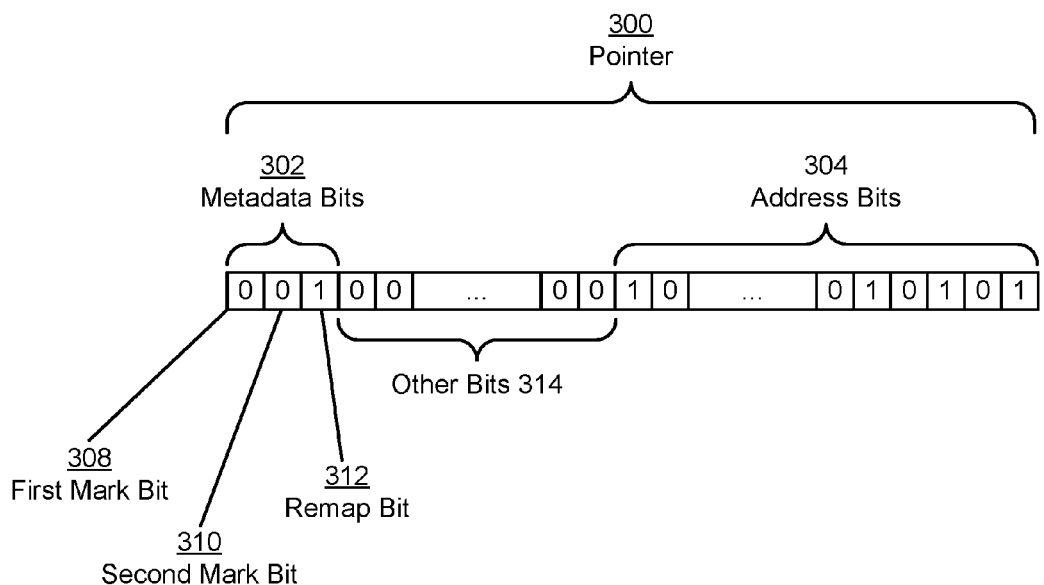
FIG. 3 shows a pointer in accordance with the disclosed embodiments.

FIG. 3 shows a pointer in accordance with the disclosed embodiments. More specifically, FIG. 3 provides an example of how bits may be arranged within a pointer so that the pointer can be efficiently classified by the load barrier.

As shown in FIG. 3, pointer 300 may be composed of a number of bits, which include metadata bits 302, address bits 304, and a number of other miscellaneous bits that are not used to store the address of the target object (i.e., the target address). For example, assuming a 4 terabyte (TB) heap is provided, pointer 300 may be a 64-bit pointer that (1) uses the 42 rightmost bits to store the target address (i.e., address bits 304 includes 42 bits), (2) uses the three leftmost bits to store metadata used by the garbage collector (i.e., metadata bits 302 includes 3 bits), and (3) uses the remaining 19 bits for other purposes (e.g., storing flags and/or other metadata). More particularly, metadata bits 302 may include first mark bit 308, second mark bit 310, and remap bit 312. It should be noted that, while the arrangement of bits shown in FIG. 3 may be in accordance with the disclosed embodiments, FIG. 3 should not be construed as limiting the scope of the embodiments. For example, in some embodiments, the metadata bits may be adjacent to the target address bits.

The metadata bits are used in combination to encode information about the pointer's state (i.e., the pointer's classification). In particular, no more than one of the three metadata bits may be set at any one time. At certain instances where a pointer is loaded into a register, whether by the software program or by the garbage collector, a load barrier applies a bitmask to the bits of the pointer to determine whether an "incorrect" bit (i.e., a "bad" bit) is set (i.e., set to '1'). Which metadata bits are considered bad bits depends on which metadata bit is considered the correct bit (i.e., the "good" bit) to be set at the time the pointer is checked by the load barrier. Which metadata bit is considered the good bit depends on which garbage-collection cycle and phase the loading takes place in. During marking phases, the load barrier sets the current mark bit to be the good bit and applies a "bad bitmask" to each loaded pointer to determine whether the remap bit or the old mark bit is set. At some point after the end of a marking phase, the load barrier sets the remap bit to be the good bit and applies a different bad bitmask to each loaded pointer to determine whether one of the mark bits is set. These bad bitmasks are described in more detail below.

First mark bit 308 and second mark bit 310 (i.e., the mark bits) are used during the marking phase of a garbage-collection cycle. At the beginning of the marking phase of a garbage-collection cycle, the load barrier designates one of the mark bits as the "current mark bit," and designates the remaining mark bit as the "old mark bit." Note that the current mark bit alternates between the first and second mark bits between successive garbage-collection cycles. For example, if first mark bit 308 is designated as the current mark bit during the marking phase of a first garbage-collection cycle, the second mark bit 310 is designated as the current mark bit during the marking phase of the (next consecutive) second garbage-collection cycle. Next, the first mark bit is designated again as the current mark bit in the marking phase of the third garbage-collection cycle. Various embodiments of the system can alternatively use a single mark bit or more than two mark bits. Additionally or alternatively, other embodiments can use a second set of the first mark bit, the second mark bit and the remap bit. The other bits 314 illustrated in FIG. 3 can include these possible additional mark bits or remap bits.

During the marking phase of a garbage-collection cycle, the garbage collector determines the liveness of all objects in one or more regions of the heap that are being collected by accessing and marking all objects reachable from the root set. To reach each of these objects, the garbage collector may dereference one or more pointers. Each time the garbage collector loads a pointer into a register, the load barrier is used to determine whether the pointer itself is "marked" by applying a bad bitmask (i.e., the bad bitmask associated with the current mark bit for the current marking cycle) to the pointer. If the pointer does not have a bad bit that is set (e.g., assuming the first mark bit is the current mark bit, the pointer does not have its second mark bit or remap bit set), the pointer is considered marked. In response, the garbage collector assumes that the target object is also marked, declines to check the target object, and moves on to check another object in the object graph.

If the pointer has a bad bit that is set (e.g., either its old mark bit or its remap bit is set), the pointer is not considered marked. In response, (1) the load barrier modifies the pointer so that only the current mark bit is set (e.g., sets the current mark bit and unsets the other metadata bits), and (2) the garbage collector accesses the target object to determine whether the target object has been marked. In some embodiments where the marking phase is a mark-remapping phase, prior to dereferencing the pointer, the load barrier may additionally determine whether the pointer needs to be remapped (i.e., the target object has been relocated) and, if necessary, remaps the pointer. If the target object is marked, the garbage collector moves on to another pointer in the object graph. If the target object is not marked, the garbage collector marks the target object as live and proceeds to check other pointers and objects reachable from the target object. In some embodiments, a load barrier executed by a mutator thread, rather than the garbage collector, performs the above described operations.

Outside of marking phases, remap bit 312 is used to determine whether a pointer is safe to dereference or propagate by the software program. At the start of the relocation phase of a garbage-collection cycle, the load barrier selects the remap bit as the good bit. During the relocation phase of the garbage-collection cycle, the garbage collector relocates live objects from the collected regions to one or more survivor regions of the heap. In doing so, however, the garbage collector may invalidate pointers that pointed to the relocated objects, making them unusable to the software program without the help of the load barrier.

Thus, each time the software program loads a pointer into a register, the load barrier determines whether the pointer is safe to use and/or dereference by applying a bad bitmask, which is different than the one used during the marking phase (i.e., this bad bitmask checks whether one of the mark bits is set) to the pointer. If the pointer does not have a bad bit that is set (e.g., the pointer does not have its first mark bit or its second mark bit set), the pointer is considered remapped. In response, the software program is allowed to dereference or propagate the pointer to access the target object.

If the pointer does have a bad bit that is set (e.g., either of its mark bits is set), the pointer is not considered remapped. In response, the load barrier consults the forwarding table to determine whether the target object has been relocated. If the target object has been relocated, the load barrier updates the pointer to point to the new address of the target object. Afterwards, the pointer is modified so that only the remap bit is set. After the load barrier modifies the pointer so that the remap bit is the only metadata bit that is set, the software program is allowed to dereference or propagate the pointer. In cases where a bad bit is set and the target object is going to be relocated during the current relocation phase but has not yet been relocated, the target object may be relocated before the remap bit is set. Here, a mutator thread may assist in relocating the target object. Because the pointer's remap bit is now set, each time the pointer is loaded by the software program until the start of the next marking phase, the load barrier may efficiently classify the pointer as being remapped.

One of the advantages of the load barrier is its efficiency. Although the load barrier may be applied to every pointer load regardless of whether the loading is done by the software program or the garbage collector, for most loads (e.g., for previously marked pointers during marking phases and/or previously remapped pointers), the operational overhead imposed by the load barrier may be small. In particular, the load barrier may check a pointer using a single test-and-branch instruction sequence as follows:

```
if (bad_bit_mask & pointer) {
    jump_to_slow_path
}
```

As shown in the above pseudocode, when a pointer is loaded into the register, the load barrier uses a bitwise AND operator to apply the relevant bad bitmask to the pointer. The relevant bad bitmask that is being used in the current garbage-collection cycle may have been created using the following steps. First, the metadata bit that is presently designated as the current mark bit is considered. Then, a "good bitmask" that results in a non-NULL value only when a bitwise AND operator is used to apply the good bitmask to a pointer that has the good bit set is obtained. For example, if the load barrier has currently designated the second mark bit 310 as the current mark bit, the good bitmask may be the following in binary form:

"0100000000000000000000-
0000000000000000000000000000000000000 000"

Next, to obtain the bad bitmask from the good bitmask, the metadata bits of the good bitmask are inverted:

"1010000000000000000000000000000000000-
0000000000000000000000 000"

Thus, applying the above bad bitmask against a pointer with either the first mark bit 308 or the remap bit 312 set results in a non-NULL value. On the other hand, applying the above bad bitmask against a pointer with second mark bit 310 set results in a NULL value.

If using the bitwise AND operation to apply the bad bitmask to the pointer results in a NULL value, the load operator proceeds on the "fast path." For example, in the context of the software program attempting to load a pointer, the load barrier allows the software program to dereference the pointer without performing any additional instructions other than a single test instruction. Additionally, aside from dereferencing the pointer, the software program is also allowed to propagate the pointer to other parts of the code without dereferencing it. Otherwise, the load barrier branches to the "slow path" to take further actions. Using the same example, the load barrier may execute one or more additional instructions to (1) set the pointer's first mark bit, second mark bit or remap bit, (2) consult the forwarding table, and/or (3) update the pointer's target address before allowing the software program to continue. Despite the possibility of entering the slow path whenever a pointer is loaded, most pointer loads result in taking the fast path because the load barrier actively "heals" any pointer that causes the slow path to be taken (e.g., marking unmarked pointers during marking phases and/or remapping invalid pointers during/after relocation phases), thereby ensuring that the slow path is taken on behalf of any single pointer at most once per garbage-collection cycle. In doing so, the load barrier ensures that, most of the time, it adds little overhead to a pointer load.

Another advantage of the load barrier lies in its versatility. For instance, using a bad bitmask rather than a good bitmask enables the load barrier to filter out NULL pointers and other pointers that have no metadata bits set in the same single test and branch instruction sequence. In some embodiments, certain pointers may be purposely designed to be ignored by the load barrier by having all metadata bits left unset. Such pointers may include pointers targeting special parts of the heap that ought to be ignored by the garbage collector, including: static objects that never die, databases, read-only areas, Class Data Sharing (CDS) archives, and/or other static subsets of the heap. So long as these pointers have all their metadata bits unset, they are ignored by the load barrier but otherwise treated as normal pointers.

It should be noted that the system may take various measures to ensure that each pointer is treated consistently (e.g., dereferences to the same address) regardless of which metadata bits are set in the pointer. In some embodiments (e.g., embodiments where the x86, x86-64, and/or AMD64 architectures are used), the heap may essentially be virtually mapped to three different locations (i.e., addresses or "views"). Thus, when a pointer is dereferenced, there may be a redirection and/or a translation from the address represented by all of the pointer's bits to the address represented by only the pointer's address bits. Therefore, regardless of whether the pointer's remap bit, first mark bit, or second mark bit is set, the pointer will always target the address represented by its address bits. For example, pointer 300 conceptually points to the address stored in address bits 304 (i.e., its conceptual address), but logically points to the address stored in the combination of metadata bits 302, the other bits, and address bits 304 (i.e., its logical address). When pointer 300 is dereferenced, a mapping and/or translation scheme may be used to convert the pointer's logical address to the pointer's conceptual address, effectively masking out remap bit 312.

In some embodiments where the computing hardware supports masking out bits within a pointer (e.g., SPARC architecture), the multiple virtual mapping may not be needed. Instead, the hardware may mask out the metadata bits when a pointer is dereferenced.

FIGS. 4A-4F each shows a system for efficiently classifying and remapping pointers in accordance with the disclosed embodiments. More specifically, FIGS. 4A-4F illustrate a number of interactions among one or more mutator threads of the software program, one or more regions of the heap, the load barrier, the forwarding table, and the garbage collector over the course of one or more garbage-collection cycles.

Figure 4A:
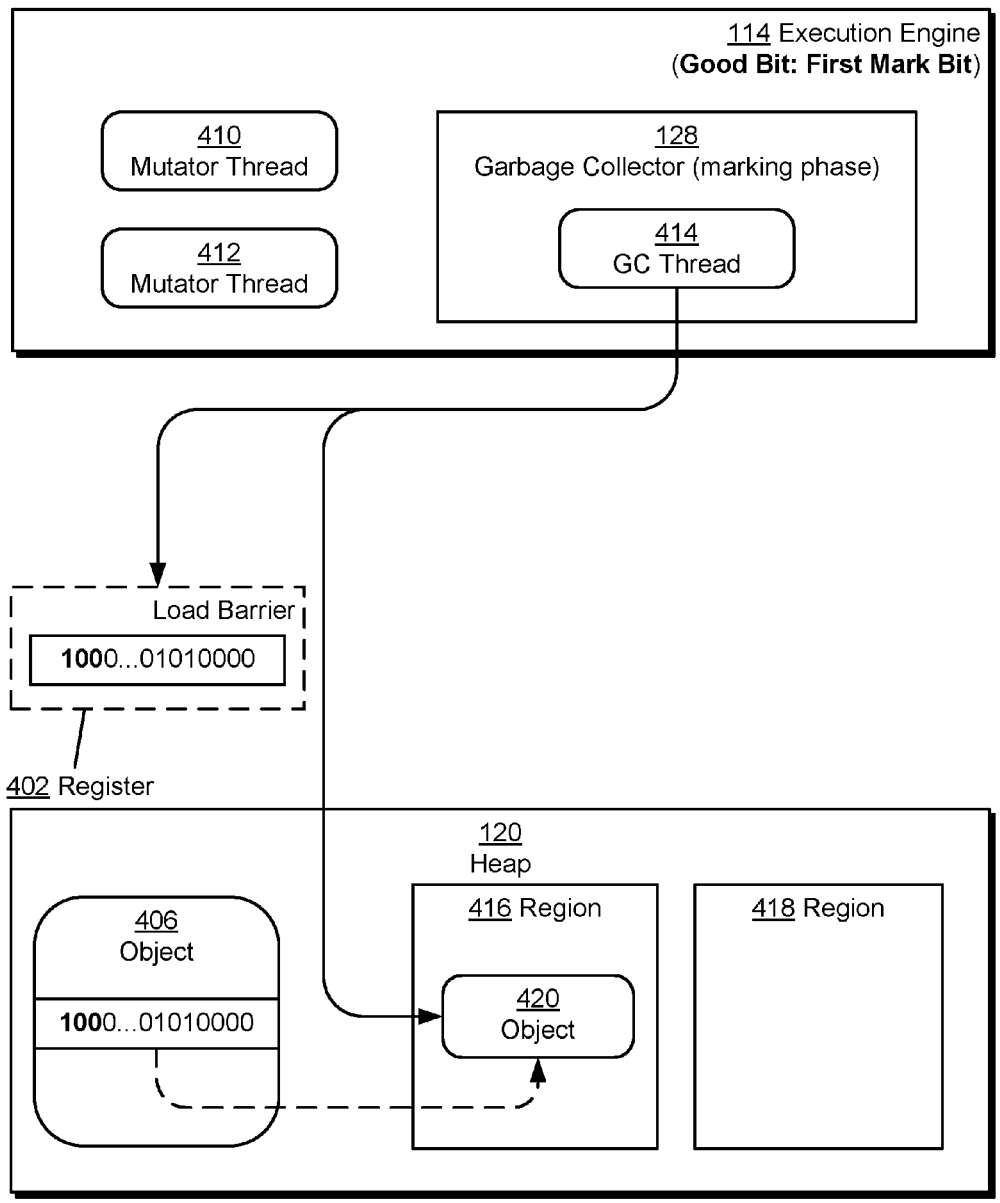
FIGS. 4A-4F each show a system for efficiently classifying and remapping pointers in accordance with the disclosed embodiments.

FIG. 4A shows execution engine 114, which includes mutator threads 410-412 of software program 104 and garbage collector 128, which itself includes garbage collector thread 414 during the marking phase of a first garbage-collection cycle. Register 402 and heap 120 are also shown. Register 402 may be one of registers 124 used by the execution engine to load operands. Heap 120 includes regions 416-418. Region 416 includes object 420, which was previously instantiated by the software program. Object 406 may refer to another object in heap 120 but not in regions 416-418.

As shown in FIG. 4A, garbage collector 128 conducts the marking phase of a first garbage-collection cycle that includes region 416. At this point, object 406 includes an object reference (i.e., a pointer field in object 406) that targets object 420. The pointer field is a 64-bit address, which is displayed in binary form (not all the bits are shown) in the figure.

At the start of the marking phase, the first mark bit (i.e., the leftmost metadata bit; e.g., first mark bit 308 of pointer 300) is designated as the current mark bit. During the marking phase, the garbage collector marks object 420 as live because the object is reachable from the pointer field in object 406. In particular, garbage collector thread 414 loads the pointer field into register 402. In response to the load, the load barrier checks whether the pointer field is marked. If the pointer field is marked, the fast path is taken, wherein the garbage collector moves on to check other objects. If the pointer field is not marked, the slow path is taken, which involves the garbage collector checking whether the object is marked, marking the object if the object has not been marked, and marking the pointer field, as shown by the '1' in the leftmost bit of the pointer field and the '1' in the leftmost bit of the copy of the pointer field loaded into register 402. For the remainder of the marking phase, each time the pointer field is loaded, the fast path is taken. The marking phase continues until the garbage collector has accounted for all live objects in the heap.

Figure 4B:
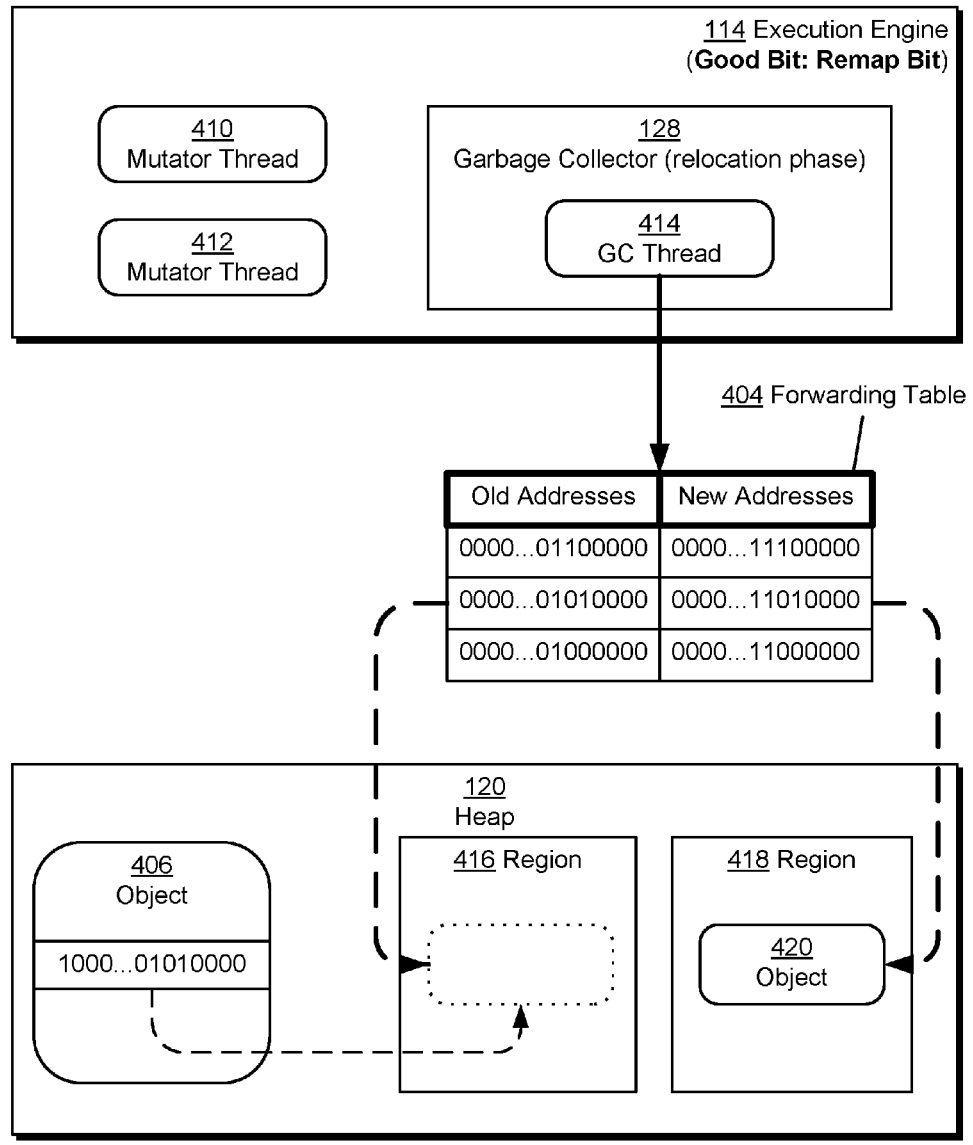

FIG. 4B shows a relocation phase that follows the marking phase of the first garbage-collection cycle. At the beginning of the relocation phase, the remap bit is designated as the good bit. During the relocation phase, the garbage collector relocates all live objects from their old locations within region 416 to new locations within region 418. Garbage collector 128 employs forwarding table 404 to associate new addresses with old addresses for each of the relocations. In some embodiments, forwarding table 404 may be a software data structure that is stored outside of region 416, wherein garbage collector threads update the data structure as object relocations are performed.

As shown in FIG. 4B, garbage collector thread 414 relocates object 420 from its old address in region 416 to a new address in region 418. As a result of this, the pointer field no longer points to the correct object. However, the garbage collector thread is also shown recording the relocation of object 420 in the second row of the forwarding table. Here, the left cell of the second row contains a pointer to the old address of object 420 while the right cell contains another pointer to the new address of object 420. It should be noted that, while the figures portray the forwarding table as storing two pointers for each object relocation (a first pointer to the old address and a second pointer to the new address), in practice, a forwarding table may be implemented in a variety ways and may include a variety of information, so long as the included information enables the load barrier to remap pointers that are invalidated by the relocation phase.

In this particular embodiment, it should be noted that while the pointer stored in the left cell of the second row and the pointer field both contain different values (since all of the metadata bits of the former pointer are unset, while the first mark bit of the pointer field is set), both pointers are treated by the system as referring to the same address (e.g., via the virtual mapping or by masking the metadata bits prior to dereferencing as previously explained above).

It should be noted that after the garbage collector relocates all live objects from region 416 to region 418, the garbage collector may immediately reuse region 416 for new allocations (i.e., storing relocated objects from another region that is part of the relocation set) during the same relocation phase. Although pointers that refer to invalid locations within region 416 may exist throughout the program state, the application of the load barrier at every pointer load ensures that each invalid pointer that is loaded is remapped to correctly point to the new region. Thus, one of the advantages of the load barrier provided by the disclosed embodiments is that, rather than delaying the usage of regions from which objects are relocated (i.e., collected regions) until pointers referring to the region have been remapped, collected regions and the address ranges assigned to the collected regions may be immediately reused for new allocations (e.g., a collected region and its assigned address range may be immediately allocated as a survivor region) during the same relocation phase. This provides the benefit of reducing heap usage and makes it possible to reduce the overall heap size and/or the address range size. In some embodiments, the garbage collector may immediately reuse the memory for a relocated object (rather than waiting until all objects in a region has been relocated), which for example allows for "in-place compaction" during the relocation phase.

Figure 4C:
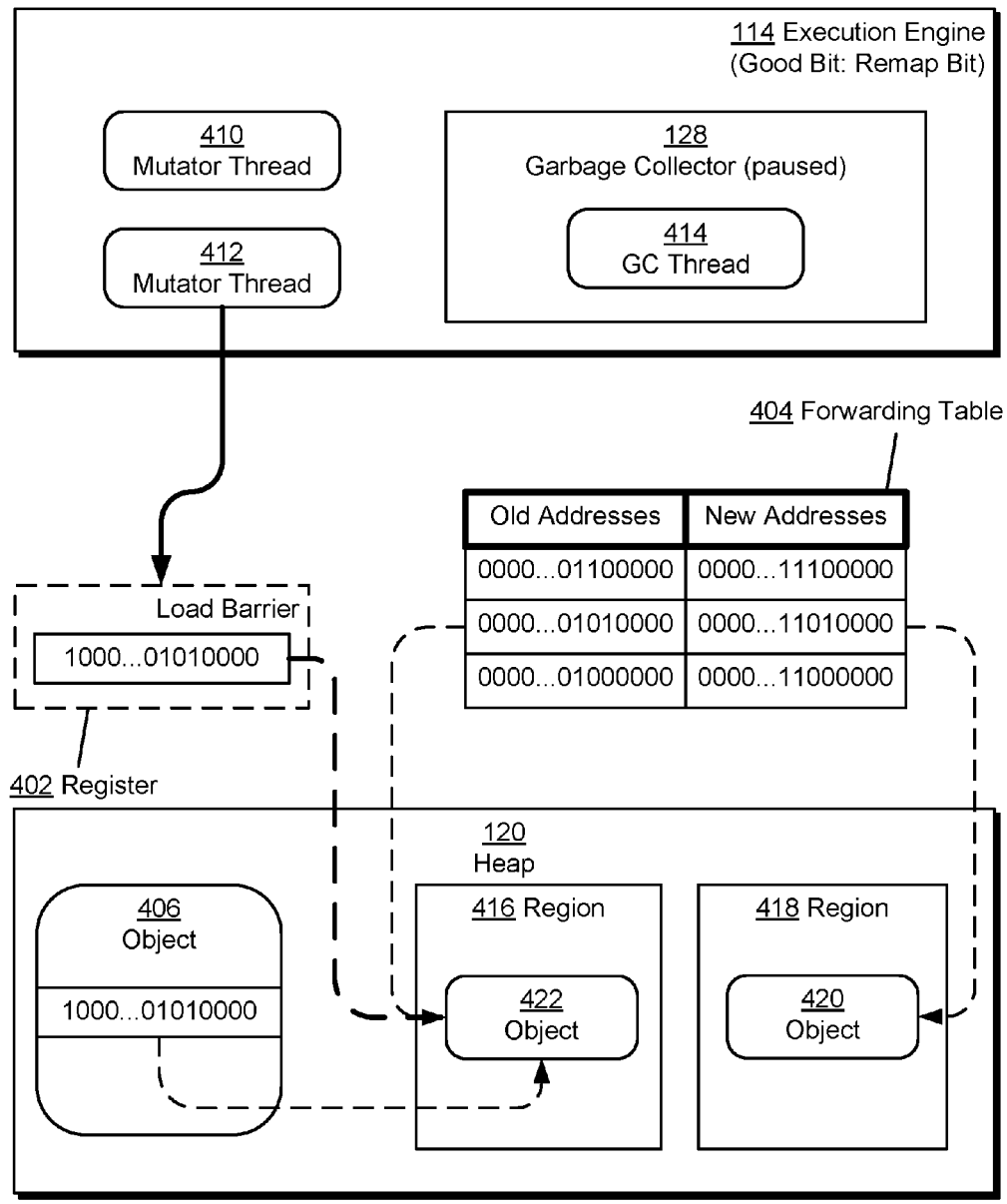

FIG. 4C shows mutator thread 412 attempting to access object 420 via the pointer field after object 420 has been relocated. It should be noted that, because region 416 was immediately reused by the garbage collector for new allocations during the relocation phase, object 422 was relocated to region 416 from another region that was part of the relocation set. Additionally, mutator threads may also immediately allocate objects within region 416.

As shown in FIG. 4C, mutator thread 412 loads the pointer field into register 402 by making a copy of the pointer's bit sequence on the register. At this point, register 402 and the pointer field both refer to the old address of object 420, which is no longer valid because it now points to object 422. While loading the pointer, the load barrier checks the metadata in the pointer to determine whether the pointer field is remapped. Because the load barrier finds that a metadata bit (the leftmost bit) other than the remap bit (the third leftmost bit) is set among the bits copied into register 402, the slow path is taken. In response to determining that (1) the pointer field is not NULL, and (2) the pointer field's remap bit is not set, the load barrier consults forwarding table 404 to determine whether the pointer field's target object has been relocated. In some embodiments, prior to consulting forwarding table 404, as a pre-filtering step, the mutator thread may determine whether the region where the pointer is located is part of the relocation set.

In particular, the load barrier may attempt to determine whether forwarding table 404 contains a row whose old address cell matches the value of the pointer field. In some embodiments, the load barrier may mask out metadata bits from the pointer field before attempting to find a match in the forwarding table. Because the second row of the forwarding table contains an old address that matches the masked value of the pointer field, the load barrier determines that the pointer field needs to be remapped. In response, the load barrier updates the address bits of the pointer field to store the new address found in the second row of the forwarding table. Additionally, the load barrier modifies the pointer field so that the remap bit is the only metadata bit that is set in the pointer field.

Figure 4D:
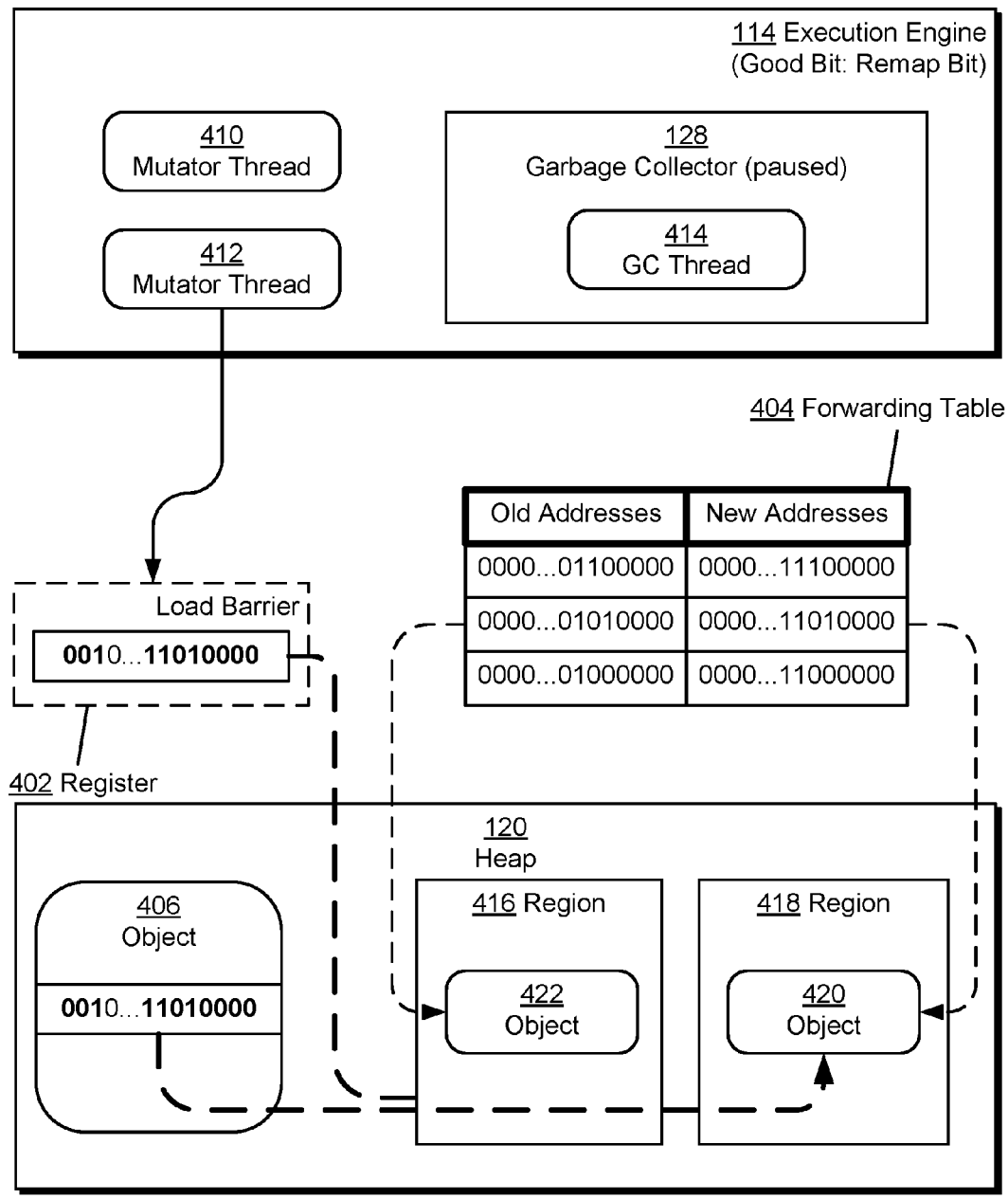

FIG. 4D shows the results of the pointer field being remapped by the load barrier. As shown in FIG. 4D, both the pointer field and the copy of the pointer field loaded into register 402 have been (1) updated to point to the new address of object 420, and (2) modified so that the remap bit is the only metadata bit set. By updating the pointer field at its original location within object 406, the load barrier ensures that, until the next garbage-collection cycle, all subsequent loads of the pointer field will cause the fast path to be taken, thereby minimizing the load barrier's overhead. Thus, until the next garbage-collection cycle, the load barrier conducts what amounts to a "lazy" remapping phase, wherein each pointer that is loaded for the first time after the marking phase by the software program is remapped by the load barrier. It should be noted, however, that not all pointers within object 406 (and other objects that referred to objects in region 416) are guaranteed to be remapped at the outset of the marking phase of the next garbage-collection cycle, which is one of the reasons why two separate mark bits are used alternately between consecutive marking phases. During each marking phase, the load barrier needs to be able to distinguish among (1) pointers that have been marked in the current marking phase, (2) pointers that have not been marked but were remapped after the previous marking phase, and (3) pointers that have not been marked and were not remapped after the previous marking phase.

Figure 4E:
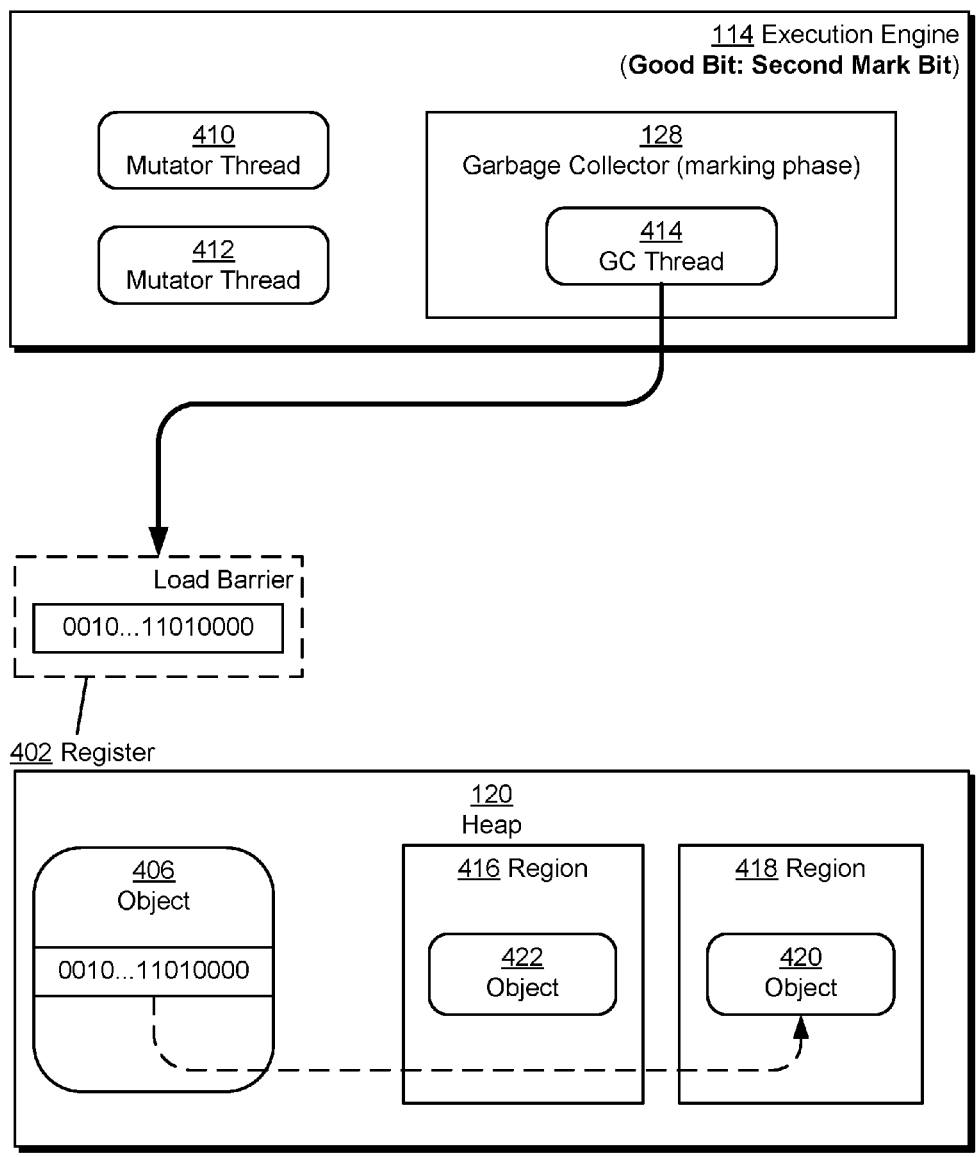

FIG. 4E shows a marking phase for a second garbage-collection cycle that follows the first-garbage collection cycle and includes region 418. At the beginning of the marking phase, the second mark bit may be designated as the current mark bit. As the garbage collector proceeds to determine which objects are live inside region 418, garbage collector thread 414 loads the pointer field into register 402. In response to the load, the load barrier checks whether the pointer field is marked. Because the pointer field is not marked (i.e., the pointer field has its remap bit rather than its second mark bit set), the slow path is taken.

Figure 4F:
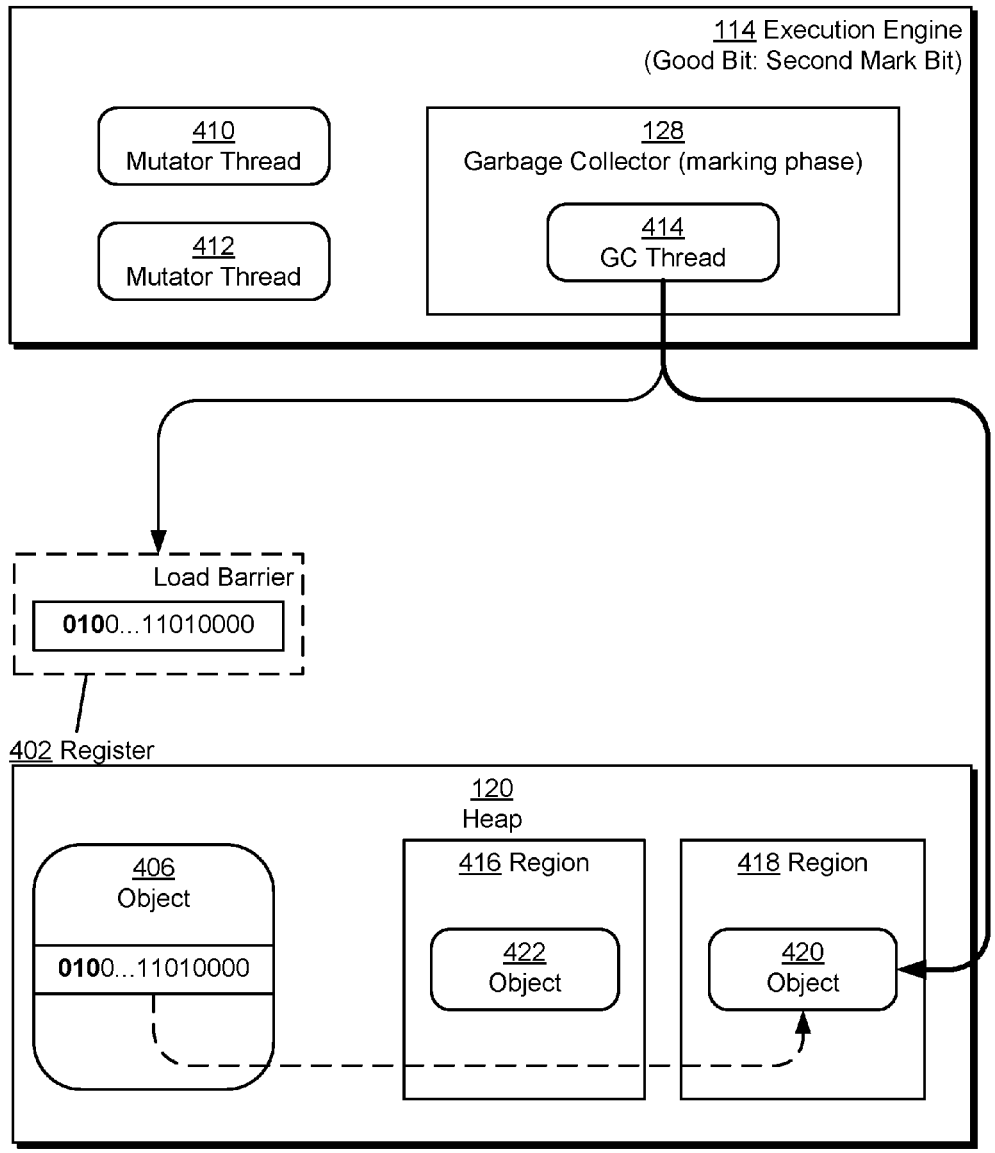

FIG. 4F shows the results of marking the pointer field during the marking phase of the second garbage-collection cycle. As shown in FIG. 4F, the metadata bits in both the pointer field and the copy of the pointer field loaded into register 402 have been modified so that only the second leftmost bit is set. Afterwards, the garbage collector checks whether object 420 is marked. In some embodiments, the garbage collector may dereference the pointer and mark the object. In some embodiments, the garbage collector may set a bit in a separate bitmap, where the index of the bit that is set corresponds to the object's address. For the remainder of the marking phase, each time the pointer field is loaded, the fast path is taken. The marking phase continues until the garbage collector has accounted for all live objects in the heap.

In some embodiments, the marking phase for each garbage-collection cycle may be a "mark-remapping" phase. In other words, for each pointer that is loaded for the first time during the marking phase, the load barrier may additionally (1) determine that the pointer was not remapped since the end of the previous marking phase, (2) determine whether the pointer refers to an object that was relocated in the previous relocation phase, and (3) if so, update the address bits of the pointer to refer to the object's new address. It should be noted, however, that because the next marking phase has already begun, the load barrier sets the relevant mark bit rather than the remap bit.

In some embodiments, a weak load barrier may be provided for loading a pointer "weakly" (i.e., load the pointer without keeping its target object alive in the context of garbage collection). The weak load barrier may apply a modified bad bit mask where only the wrong mark bit is considered a bad bit. By modifying the bad bit mask, the behavior of the load barrier may be changed without introducing additional instructions on top of the single test and branch instruction sequence:

```
if (weak_bad_bit_mask & pointer) {
    jump_to_slow_path
}
```

Examples where a weak load barrier may be useful include reading a StringTable object in the JVM. When performing a lookup operation for a string within the StringTable, the software program may walk over several pointers and dereference each of them as it searches for a match. Because the lookup operation itself should not cause the target objects of these pointers to become marked, the StringTable's implementation may benefit from the use of weak load barriers.

Figure 5:
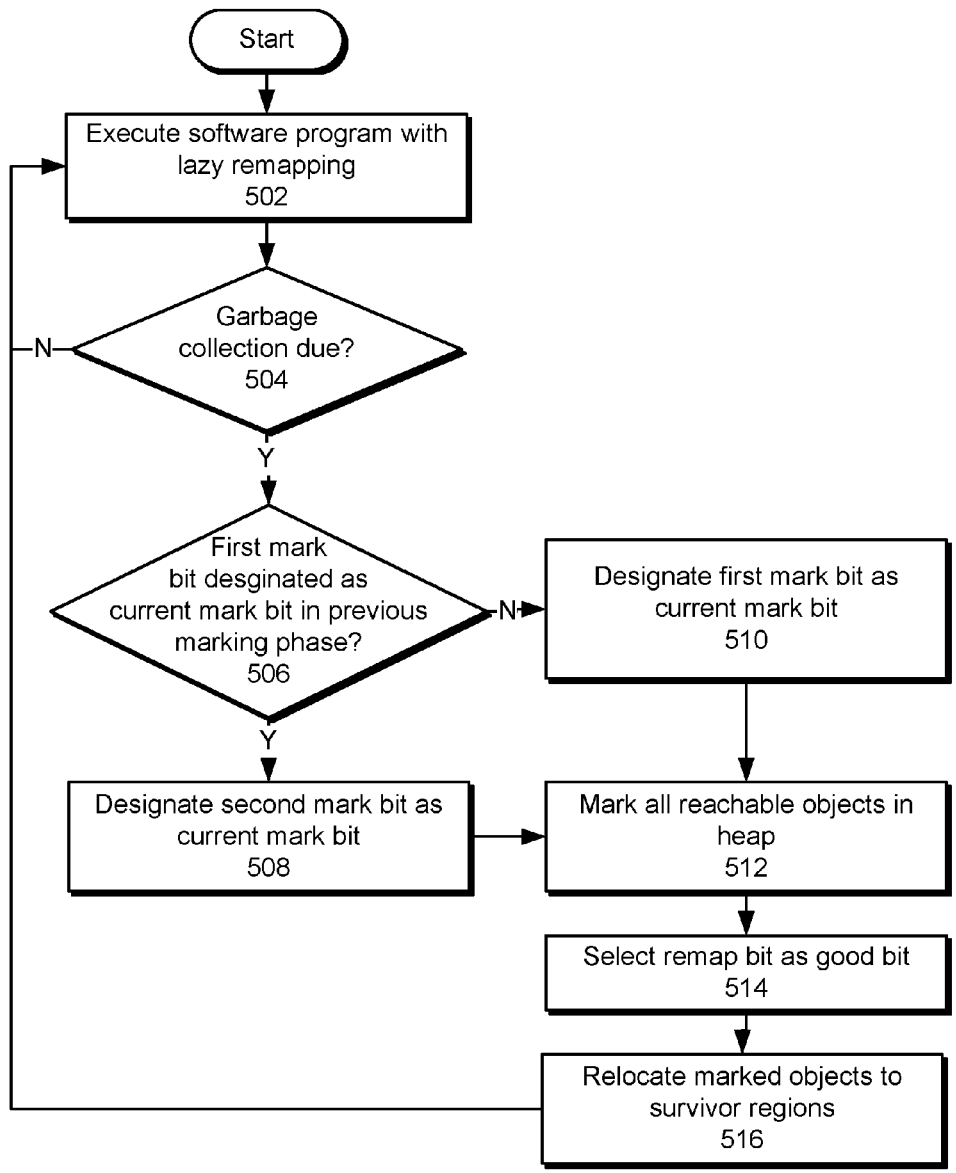
FIG. 5 shows a flowchart illustrating an exemplary process of performing a garbage collection in parallel with executing of a software program in accordance with the disclosed embodiments.

FIG. 5 shows a flowchart illustrating an exemplary process of performing a garbage collection concurrently with the execution of a software program in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

During operation, a software program executes within a host environment, wherein when the software program loads a pointer to access an object stored on a heap, a load barrier checks whether the pointer needs to be remapped and remaps the pointer as necessary (operation 502). During the software program's execution, a concurrent garbage collector monitors the heap and initiates a garbage collection on the heap when heap usage surpasses a threshold (decision 504). At the start of the marking phase of a garbage-collection cycle, if the first mark bit was selected as the current mark bit in the marking phase of the previous garbage-collection cycle (decision 506), the second mark bit is selected as the current mark bit (operation 508). Otherwise, the first mark bit is selected as the current mark bit (operation 510). During the marking phase, the garbage collector marks all objects in the heap that are reachable from the root set as live (operation 512). At the start of the relocation phase, the remap bit is selected as the good bit (operation 514). During the relocation phase, the garbage collector relocates all live objects from regions within the relocation set to one or more survivor regions (operation 516). After the relocation phase, the garbage collection is largely finished. While the software program continues to execute, pointers loaded by the software program may be lazily remapped by the load barrier (operation 502).

In some embodiments, execution of the software program may be interleaved with the conducting of the marking phases and/or the relocation phases by the garbage collector. In some embodiments where not all pointers are remapped and/or updated prior to the beginning of a new marking phase, for each pointer that is marked during the marking phase, the garbage collector may additionally update and/or remap the pointer if the pointer is found to be invalid due to its target object having been relocated in the previous relocation phase.

Figure 6:
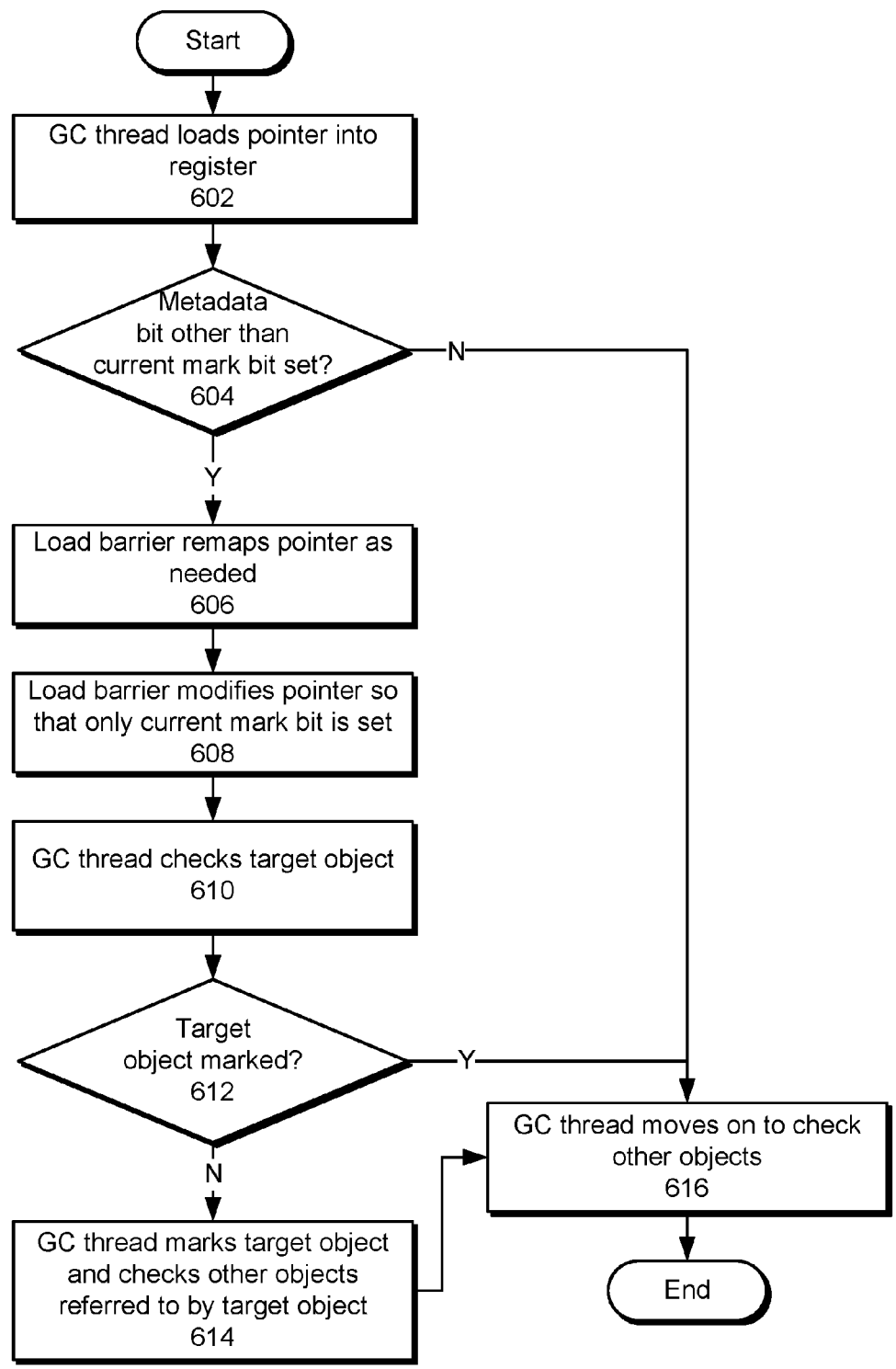
FIG. 6 shows a flowchart illustrating an exemplary process of marking a pointer and a target object in accordance with the disclosed embodiments.

FIG. 6 shows a flowchart illustrating an exemplary process of marking a pointer and a target object in accordance with the disclosed embodiments. In one or more embodiments, one or more of the steps may be omitted, repeated, and/or performed in a different order. Accordingly, the specific arrangement of steps shown in FIG. 6 should not be construed as limiting the scope of the embodiments.

During the marking phase of a garbage-collection cycle, a garbage collector thread loads a pointer into a register with the intention of checking whether its target object is marked (operation 602). In response, the load barrier checks the pointer to see whether a metadata bit other than the selected mark bit is set (decision 604). If no metadata bit other than the current mark bit is set, the load barrier determines that the pointer is marked, thereby allowing the garbage collector thread to assume that the target object is also marked. In response, the garbage collector thread moves on to check and mark other objects within the heap (operation 616). If a metadata bit other than the current mark bit is set, the following steps are taken. If the load barrier determines that (1) the pointer was not remapped since the end of the previous marking phase, and (2) the target object was relocated in the previous relocation phase, the load barrier updates the address of the pointer so that the pointer refers to the target object's new location (operation 606). Next, the load barrier marks the pointer by modifying the pointer so that only the current mark bit is set (operation 608). The garbage collector thread then checks whether the target object is marked (operation 610). If the target object is marked (decision 612), the garbage collector thread moves on to check and mark other objects within the heap (operation 616). If the target object is not marked, however, the garbage collector thread marks the target object and begins following pointers stored within the object (e.g., the object's fields) to check and mark other objects referred to by the target object (operation 614) before moving on to check and mark other objects within the heap (operation 616). In some embodiments, the garbage collector may move on to check and mark other objects within the heap before returning to mark the target object and follow pointers stored within the target object.

Figure 7:
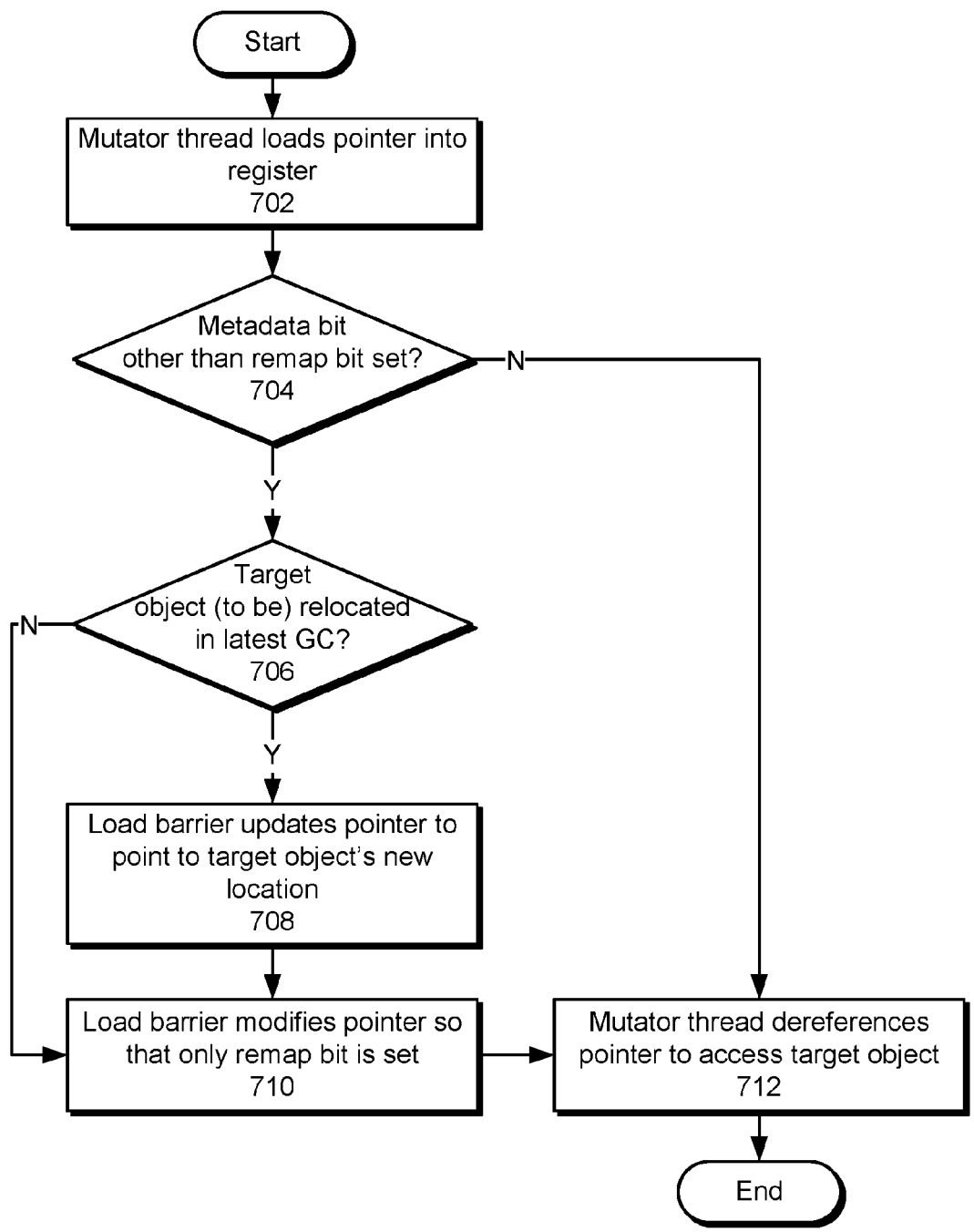
FIG. 7 shows a flowchart illustrating an exemplary process of efficiently classifying and remapping a pointer in accordance with the disclosed embodiments.

FIG. 7 shows a flowchart illustrating an exemplary process of efficiently classifying and remapping a pointer in accordance with the disclosed embodiments. In one or more embodiments, one or more of the steps may be omitted, repeated, and/or performed in a different order. Accordingly, the specific arrangement of steps shown in FIG. 7 should not be construed as limiting the scope of the embodiments.

During the execution of the software program outside of the marking phase of any garbage-collection cycle, a mutator thread of the software program loads a pointer into the register with the intention of accessing an object previously created by the software program (operation 702). In response, the load barrier checks the pointer to see whether a metadata bit other than the remap bit is set (decision 704). If no metadata bit other than the remap bit is set, the mutator thread is allowed to dereference the pointer to access the target object (operation 712). If a metadata bit other than the remap bit is set, the load barrier determines whether the pointer's target object was relocated during the relocation phase of the latest garbage-collection cycle or is going to be relocated during the relocation phase (decision 706). If the target object was not relocated or is not going to be relocated, the load barrier modifies the pointer so that only the remap bit is set (operation 710) before allowing the mutator thread to dereference the pointer to access the target object (operation 712). If the target object was relocated or is going to be relocated, the load barrier updates the pointer to point to the target object's new location (operation 708) and modifies the pointer so that only the remap bit is set (operation 710) before allowing the mutator thread to dereference the pointer to access the target object (operation 712).

Figure 8:
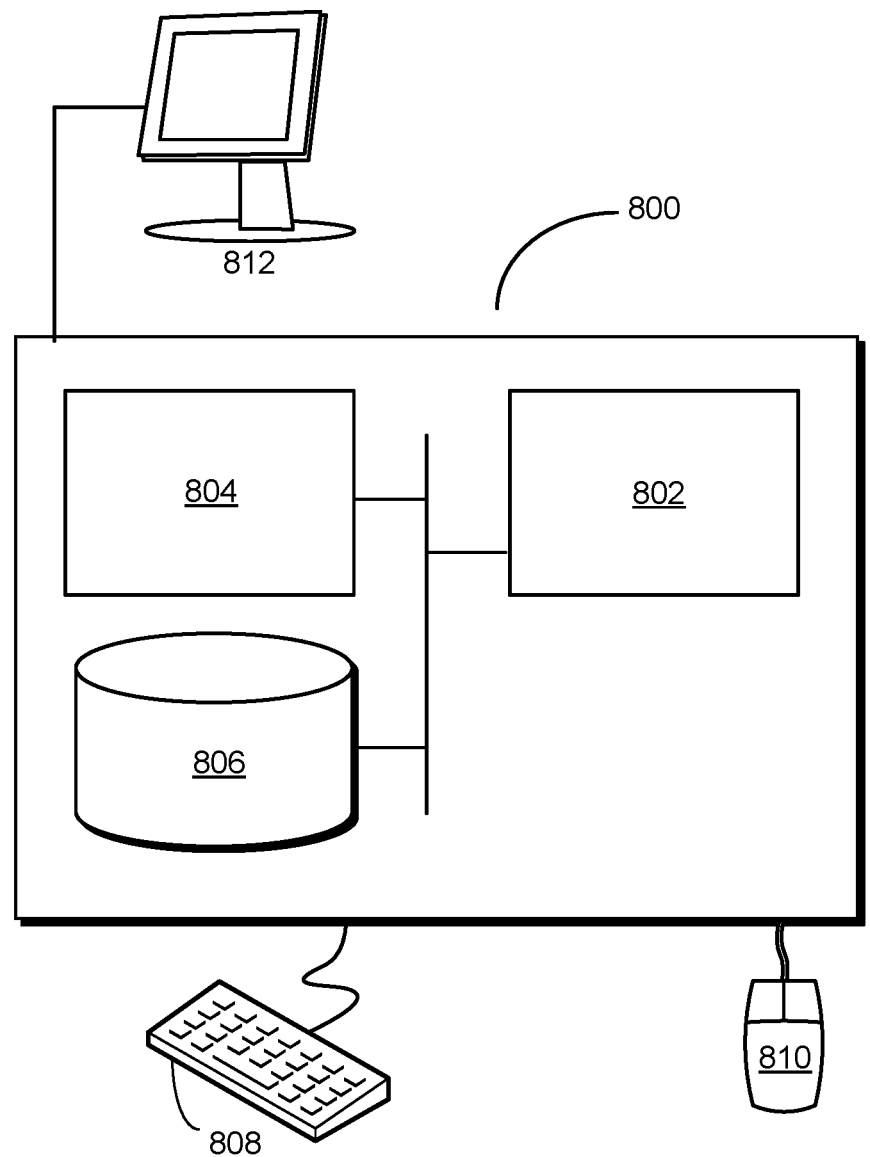
FIG. 8 shows a computer system in accordance with the disclosed embodiments.

FIG. 8 shows a computer system 800 in accordance with an embodiment. Computer system 800 may correspond to an apparatus that includes a processor 802, memory 804, storage 806, and/or other components found in electronic computing devices. Processor 802 may support parallel processing and/or multi-threaded operation with other processors in computer system 800. Computer system 800 may also include input/output (I/O) devices such as a keyboard 808, a mouse 810, and a display 812.

Computer system 800 may include functionality to execute various components of the present embodiments. In particular, computer system 800 may include an operating system (not shown) that coordinates the use of hardware and software resources on computer system 800, as well as one or more applications that perform specialized tasks for the user. To perform tasks for the user, applications may obtain the use of hardware resources on computer system 800 from the operating system, as well as interact with the user through a hardware and/or software framework provided by the operating system.

In one or more embodiments, computer system 800 provides a system for efficiently classifying pointers loaded by a software program that is subject to concurrent garbage collection. The system may include a load barrier apparatus that checks pointers loaded by the software program. Upon determining that a loaded pointer may need to be remapped prior to being dereferenced, the load barrier apparatus may (1) determine whether a target object referred to by the pointer has been relocated in the latest garbage-collection cycle, (2) if so, update the pointer to refer to the target object's new address, and (3) modify the pointer so that its remap bit is the only metadata bit set in the pointer. The load barrier apparatus may then allow the software program to dereference the pointer.

During the marking phase of a given garbage-collection cycle of the software program, the garbage collector marks pointers by modifying pointers so that a current mark bit of each of the pointers is the only metadata bit that is set in the pointer. Recall that the mark bit alternates between the first and second mark bits during successive garbage-collection cycles.

In addition, one or more components of computer system 800 may be remotely located and connected to the other components over a network. Portions of the present embodiments (e.g., application apparatus, controller apparatus, data processing apparatus, etc.) may also be located on different nodes of a distributed system that implements the embodiments.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
    executing applications in a computing environment that uses a garbage collector to perform memory-management operations, wherein each pointer used by the applications includes metadata in addition to address bits, and wherein the metadata includes a first mark bit, a second mark bit and a remap bit, wherein during each collection cycle for the garbage collector, one of the first mark bit and the second mark bit is designated as a current mark bit, and the remaining mark bit is designated as an old mark bit, wherein the current mark bit alternates between the first mark bit and the second mark bit during successive collection cycles;
    during a marking phase of a collection cycle, modifying each pointer that is accessed so that the pointer's current mark bit is set and the pointer's old mark bit and remap bit are not set; and
    while executing an application outside of a marking phase, in response to the application executing an instruction that loads a pointer from memory:
        if one of the first mark bit and the second mark bit is set, taking further actions, which involves:
            determining whether the object has been relocated to a new address during a current collection cycle for the garbage collector,
            upon determining that the object has been relocated, updating the pointer to point to the new address, and
            modifying the pointer so that the remap bit is set and the first and second mark bits are not set.

2. The method of claim 1, wherein the pointer is loaded from memory into a local variable or a register.

3. The method of claim 1, wherein in response to the application subsequently executing an instruction that accesses an object through the pointer after the pointer has been loaded from memory, dereferencing the pointer to access the object.

4. The method of claim 1, wherein a load barrier is applied to pointers loaded by the executing applications and the garbage collector, wherein the load barrier is responsible for performing any operations that read and/or modify the first mark bit, the second mark bit and the remap bit.

5. The method of claim 4,
    wherein the load barrier ensures that only one of the first mark bit, the second mark bit and the remap bit is set at any given time;
    wherein the method designates one of the first mark bit, the second mark bit and the remap bit as a good bit, wherein during a marking phase, the current mark bit is designated as the good bit, and wherein at the start of a relocation phase for the garbage collector, the remap bit is designated as the good bit; and
    wherein the load barrier uses a bad bitmask, which masks out the good bit and does not mask out other metadata bits, thereby enabling the load barrier to execute a single test-and-branch instruction sequence to determine whether to take further actions based on whether any metadata bit besides the good bit is set while simultaneously filtering out NULL pointers and other pointers that have no metadata bits set.

6. The method of claim 5, wherein a weak load barrier is additionally applied to some loaded pointers, wherein while determining whether to take further actions, the weak load barrier uses a modified bad bitmask, which masks out all of the metadata bits except for the remap bit.

7. The method of claim 1,
    wherein after an object is relocated by the garbage collector and a forwarding table is updated to indicate a new location for the object, immediately reusing memory locations that were occupied by the object prior to the relocation without having to wait until pointers that reference object are updated to point to the new location for the object; and
    wherein when an application attempts to load a pointer to an object that has been relocated, using a load barrier to ensure that the object is accessed through an updated pointer that points to a new location for the object.

8. The method of claim 7, wherein both physical memory and virtual memory locations that were occupied by the object prior to the relocation can be reused.

9. The method of claim 1, wherein while executing an application inside of a marking phase for the garbage collector, in response to the application executing an instruction that loads a pointer from memory:
    if one of the remap bit and the old mark bit is set, taking further actions, which involves:
        if the remap bit is not set, determining whether the object has been relocated to a new address during the previous collection cycle for the garbage collector,
        upon determining that the object has been relocated, updating the pointer to point to the new address,
        marking the object as live, and
        modifying the pointer so that the current mark bit is set and the remap bit and the old mark bit are not set.

10. One or more non-transitory computer-readable storage media storing instructions that when executed by a computer cause the computer to perform a method, the method comprising, the method comprising:

executing applications in a computing environment that uses a garbage collector to perform memory-management operations, wherein each pointer used by the applications includes metadata in addition to address bits, and wherein the metadata includes a first mark bit, a second mark bit and a remap bit, wherein during each collection cycle for the garbage collector, one of the first mark bit and the second mark bit is designated as a current mark bit, and the remaining mark bit is designated as an old mark bit, wherein the current mark bit alternates between the first mark bit and the second mark bit during successive collection cycles;

during a marking phase of a collection cycle, modifying each pointer that is accessed so that the pointer's current mark bit is set and the pointer's old mark bit and remap bit are not set; and while executing an application outside of a marking phase, in response to the application executing an instruction that loads a pointer from memory:

if one of the first mark bit and the second mark bit is set, taking further actions, which involves:

determining whether the object has been relocated to a new address during a current collection cycle for the garbage collector, upon determining that the object has been relocated, updating the pointer to point to the new address, and modifying the pointer so that the remap bit is set and the first and second mark bits are not set.

11. The one or more non-transitory computer-readable storage media of claim 10, wherein the pointer is loaded from memory into a local variable or a register.

12. The one or more non-transitory computer-readable storage media of claim 10, wherein in response to the application subsequently executing an instruction that accesses an object through the pointer after the pointer has been loaded from memory, the method comprises dereferencing the pointer to access the object.

13. The one or more non-transitory computer-readable storage media of claim 10, wherein a load barrier is applied to pointers loaded by the executing applications and the garbage collector, wherein the load barrier is responsible for performing any operations that read and/or modify the first mark bit, the second mark bit and the remap bit.

14. The one or more non-transitory computer-readable storage media of claim 13, wherein the load barrier ensures that only one of the first mark bit, the second mark bit and the remap bit is set at any given time;

wherein the method designates one of the first mark bit, the second mark bit and the remap bit as a good bit, wherein during a marking phase, the current mark bit is designated as the good bit, and wherein at the start of a relocation phase for the garbage collector, the remap bit is designated as the good bit; and wherein the load barrier uses a bad bitmask, which masks out the good bit and does not mask out other metadata bits, thereby enabling the load barrier to execute a single test-and-branch instruction sequence to determine whether to take further actions based on whether any metadata bit besides the good bit is set while simultaneously filtering out NULL pointers and other pointers that have no metadata bits set.

15. The one or more non-transitory computer-readable storage media of claim 14, wherein a weak load barrier is additionally applied to some loaded pointers, wherein while determining whether to take further actions, the weak load barrier uses a modified bad bitmask, which masks out all of the metadata bits except for the remap bit.

16. The one or more non-transitory computer-readable storage media of claim 10, wherein after an object is relocated by the garbage collector and a forwarding table is updated to indicate a new location for the object, the method comprises immediately reusing memory locations that were occupied by the object prior to the relocation without having to wait until pointers that reference object are updated to point to the new location for the object; and wherein when an application attempts to load a pointer to an object that has been relocated, the method comprises using a load barrier to ensure that the object is accessed through an updated pointer that points to a new location for the object.

17. The one or more non-transitory computer-readable storage media of claim 16, wherein both physical memory and virtual memory locations that were occupied by the object prior to the relocation can be reused.

18. The one or more non-transitory computer-readable storage media of claim 10, wherein while executing an application inside of a marking phase for the garbage collector, in response to the application executing an instruction that loads a pointer from memory, the method performs the following operations:

if one of the remap bit and the old mark bit is set, taking further actions, which involves:

if the remap bit is not set, determining whether the object has been relocated to a new address during the previous collection cycle for the garbage collector, upon determining that the object has been relocated, updating the pointer to point to the new address, marking the object as live, and modifying the pointer so that the current mark bit is set and the remap bit and the old mark bit are not set.

19. A method, comprising:

while executing an application in a computing environment that uses a garbage collector to perform memory-management operations, in response to the application executing an instruction that loads a pointer from memory, using a load barrier to perform the following operations:

examining metadata in the pointer to determine whether a remap flag is set; and if the remap flag is not set and the pointer is not a NULL pointer, determining whether the object has been relocated to a new address, if the object has been relocated, updating the pointer is to point to the new address, and modifying the metadata in the pointer to indicate that the remap flag is set.

20. The method of claim 19, wherein the metadata includes one or more mark bits, which are used during a marking phase of a collection cycle for the garbage collector.

* * * * *

UNITED STATES PATENT AND TRADEMARK OFFICE
CERTIFICATE OF CORRECTION

PATENT NO. : 9,921,959 B2  
APPLICATION NO. : 15/267748  
DATED : March 20, 2018  
INVENTOR(S) : Liden et al.

Page 1 of 1

It is certified that error appears in the above-identified patent and that said Letters Patent is hereby corrected as shown below:

In the Specification

In Column 12, Line 20, delete "000 000"" and insert -- 000000" --, therefor.

In Column 12, Line 24, delete "000 000"" and insert -- 000000" --, therefor.

In the Claims

In Column 21, Line 2, in Claim 10, delete "comprising, the method comprising:" and insert -- comprising: --, therefor.

Signed and Sealed this  
Twenty-first Day of August, 2018

Andrei Iancu  
*Director of the United States Patent and Trademark Office*